Patented June 24, 1930

1,766,947

UNITED STATES PATENT OFFICE

KENNETH HERBERT SAUNDERS, OF MANCHESTER, ENGLAND, ASSIGNOR TO BRITISH DYESTUFFS CORPORATION LIMITED, OF MANCHESTER, ENGLAND

MANUFACTURE OF NEW AZO DYESTUFFS

No Drawing. Application filed June 10, 1926, Serial No. 115,122, and in Great Britain August 4, 1925.
Renewed September 10, 1929.

In my prior application Ser. No. 53,404, filed August 29, 1925, I have described the production of new azo dyestuffs which are fixed by a mordant without a great change in shade of dyeing. This property of these dyestuffs is due to the separation of the chromophoric portion of the molecule from the chelate group by a sulphone bridge. In the above-mentioned prior application, I have also disclosed a process of making the amino sulphones which are used as intermediates to produce the azo dyes therein set forth. These amino sulphones are of the general type $$H_2N-R_1-SO_2-\underset{COOH}{\underset{|}{\bigcirc}}-OH$$

wherein $R_1$ is an aromatic residue and the benzene nucleus containing the .OH and .COOH groups may be further substituted.

The present invention relates to azo dyes of a different type but which are also fixed by a mordant without a great change in the shade of the dyeings and further relates to a method of producing such azo dyes. The dyes of the present invention contain two chromophore groups, namely the azo group and the triphenylmethane group, both of which are separated from the chelate group, that is the ortho-hydroxy-carboxylic group, by a sulphone ($—SO_2—$) bridge. These new dyes produce shades which are the result of the joint effect of the two chromophore groups. The original color of these dyestuffs is due to the azo chromophore, but the final or composite shade is produced when the leuco triphenylmethane nucleus is oxidized to an actual dye group and the two chromophore groups exercise their joint effect. These dyestuffs are advantageous as they satisfactorily produce a range of shades hitherto only partially obtainable by mixed dyeing. They are further advantageous in that the external chelate group may be fixed without affecting the final or composite shade.

I find that these amino sulphones of my above mentioned prior application, of which the following example is typical:

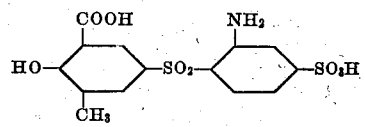

condense with tetra-methyl- or other tetra-alkyldiamino-benzhydrols to form amino-triarylmethanes. These amino-triarylmethanes are the first components of my new azo dyes. They are represented by the general formula:

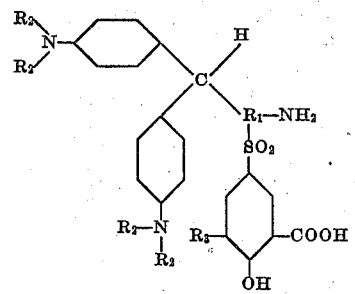

wherein $R_1$ is an aromatic residue, $R_2$ is an alkyl group and $R_3$ is a substituent group. I prefer to use a sulphone in which the position ortho to the hydroxy group is substituted, so that condensation in the ring which is concerned with the chelate functions of the molecule is precluded.

Adjective dyes owe their lake-forming properties to the presence of at least one unsaturated group, capable of taking up two positions in the coordination complex surrounding a metallic atom so that the latter becomes finally held in a heterocyclic ring. Groups of this character are termed chelate groups. (See Morgan, Journal of the London Chemical Society, 1922, vol. 121, page 2857.) The term "chelate group," is used in this sense in the present application. In the dyestuffs coming under the present invention, where an ortho-hydroxy-carboxylic group occurs, it is a chelate group.

These new amino-triarylmethanes diazotize and couple readily. Any hydroxy, amino, or amino-hydroxy compound capable of coupling may be used as second component, the choice being determined by the purpose in view. The dyes obtained are of the general type:

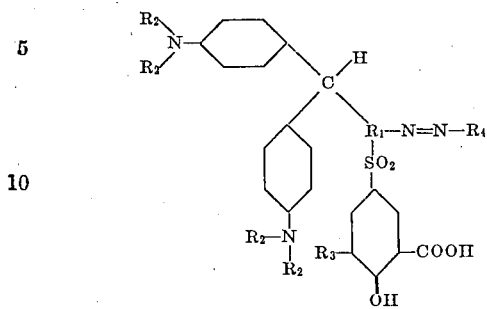

where $R_1$ represents an aromatic residue, $R_2$ represents alkyl groups, $R_3$ is a substituent group and $R_4$ is the residue from the usual azo dye second component, containing hydroxy or amino groups or both. The yellow to red monazo dyestuffs so obtained dye animal fibers from an acid bath in the usual manner. When, however, these dyeings are afterwards chromed, not only fixation by the external chelate group occurs, but also oxidation takes place, whereby a triarylmethane dyestuff is produced on the fibre, the net result being a molecule having a mixed chromophore. In this way there can be produced a range of shades hitherto only obtainable by mixed dyeing, and in particular should be mentioned the green dyeings which result when the original azo dyestuff is yellow.

*Example*

An amino triarylmethane having the probable constitution:

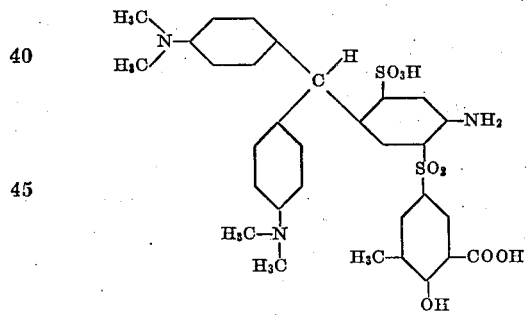

is obtained by condensing together in sulphuric acid monohydrate at 100° C. for three hours, 423 parts of tetramethyldiaminobenzhydrol with 607 parts of an amino-sulphone derived by the reduction of the condensation product of 5-sulphino-o-cresotinic acid with 4-chloro-3-nitrobenzene sulphonic acid and having the probable formula

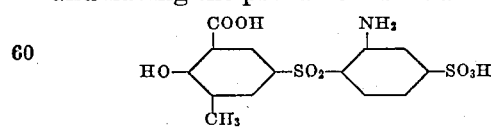

It is isolated by pouring into water, partly neutralizing and filtering off the white solid.

1,000 parts of this triarylmethane base are dissolved in water with 166 parts of sodium carbonate and 108 parts of sodium nitrite. The whole is allowed to flow into well-chilled and stirred mineral acid. When diazotization is complete, as shown by the absorption of all nitrous acid, the diazo compound is allowed to run into a solution of 272 parts of 1-phenyl-3-methyl-5-pyrazolone dissolved in caustic soda and excess of sodium carbonate. Coupling occurs at once. The yellow dyestuff is salted from solution, filtered and dried. The product in the form of its free acid has the probable constitution

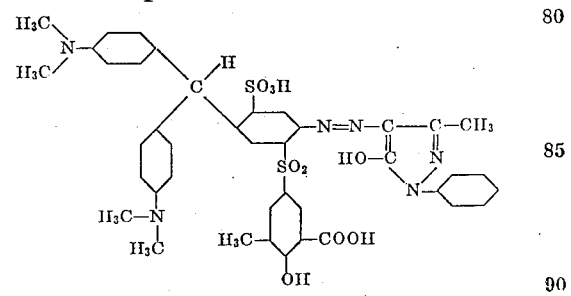

It dyes wool or chromed wool from an acid bath yellow, passing on after-chroming, to a bright yellowish-green, fast to milling.

If for the phenylmethylpyrazolone in the above example, an equivalent quantity of beta-naphthol be substituted, an orange dyestuff is obtained which becomes brown on chroming, while ethyl-beta-naphthylamine in similar manner gives a red dyestuff which becomes violet after oxidation and fixation by bichromate. Using beta-naphthol the product obtained, in the form of the free acid has the probable formula

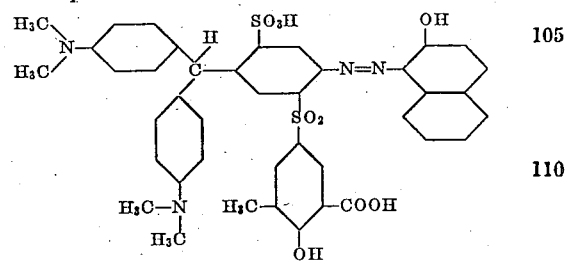

while the product obtained with ethyl-beta-naphthylamine, in the form of the free acid has the probable formula

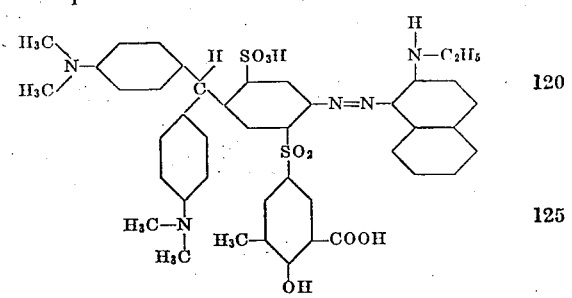

In chromable azo dyestuffs of the triarylmethane series made under the present invention, the chelate group is situated in a part of the molecule separated from the rest of the molecule containing the chromophore groups by a sulphone (—SO$_2$—) bridge.

The new dyestuffs are ordinarily prepared in the leuco form and are readily oxidizable. By aerial oxidation they give dyes of the same shades as the chromed dyes.

I claim:

1. In the manufacture of chromable azo dyestuffs of the triarylmethane series in which the chelate group is situated in a part of the molecule separated from the rest of the molecule containing the chromophore groups by a sulphone (—SO$_2$—) bridge, the process which comprises condensing a tetraalkyldiaminobenzhydrol with an aminosulphone obtained by reducing the product of the reaction between a sulphinic acid of the type

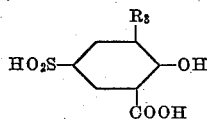

in which R$_3$ is a substituent group, and an aromatic nitro compound having a reactive halogen atom, and then diazotizing this condensation product and coupling with the usual second components.

2. In the manufacture of chromable azo dyestuffs of the triarylmethane series in which the chelate group is situated in a part of the molecule separated from the rest of the molecule containing the chromophore groups by a sulphone (—SO$_2$—) bridge, the process which comprises condensing a tetraalkyldiaminobenzhydrol with the aminosulphone obtained by reducing the product of the reaction between the 5-sulphino-o-cresotinic acid of the formula

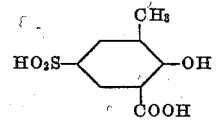

and an aromatic nitro compound having a reactive halogen atom, and then diazotizing this condensation product and coupling with the usual second components.

3. In the manufacture of chromable azo dyestuffs of triarylmethane series in which the chelate group is situated in a part of the molecule separated from the rest of the molecule containing the chromophore groups by a sulphone (—SO$_2$—) bridge, the process which comprises condensing a tetraalkyldiaminobenzhydrol with the aminosulphone obtained by reducing the product of the reaction between the 5-sulphino-o-cresotinic acid of the formula

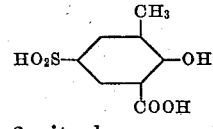

and 4-chloro-3-nitrobenzenesulphonic acid, and then diazotizing this condensation product and coupling with the usual second components.

4. In the manufacture of chromable azo dyestuffs of the triarylmethane series in which the chelate group is situated in a part of the molecule separated from the rest of the molecule containing the chromophore groups by a sulphone (—SO$_2$—) bridge, the process which comprises condensing tetramethyldiaminobenzhydrol with the aminosulphone obtained by reducing the product of the reaction between the 5-sulphino-o-cresotinic acid of the formula

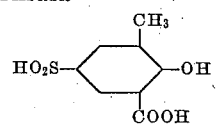

and 4-chloro-3-nitrobenzenesulphonic acid, and then diazotizing this condensation product and coupling with the usual second components.

5. In the manufacture of chromable azo dyestuffs of the triarylmethane series in which the chelate group is situated in a part of the molecule separated from the rest of the molecule containing the chromophore group by a sulphone (—SO$_2$—) bridge, the steps which comprise condensing a tetraalkyldiaminobenzhydrol with an amino sulphone of the type

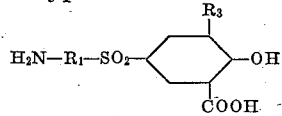

wherein R$_1$ represents an aromatic residue and R$_3$ represents a substituent group, and then diazotizing the so produced condensation product and coupling with the usual second components.

6. In the manufacture of chromable azo dyestuffs of the triarylmethane series in which the chelate group is situated in a part of the molecule separated from the rest of the molecule containing the chromophore groups by a sulphone (—SO$_2$—) bridge, the steps which comprise condensing a tetraalkyldiaminobenzhydrol with an amino sulphone having the probable formula

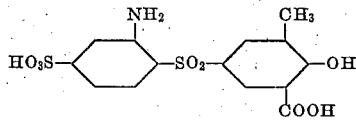

and then diazotizing the so produced condensation product and coupling with the usual second components.

7. As new products, chromable azo dyestuffs of the triarylmethane series having the probable structure

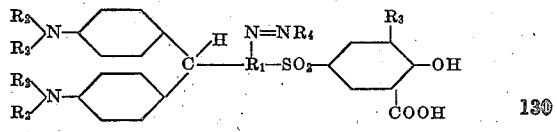

wherein $R_1$ = an aromatic residue, $R_2$ represents alkyl groups, $R_3$ is a substituent group and $R_4$ is a residue from the usual azo dye second components, containing hydroxy or amino groups or both, the said dyestuffs having the chelate group situated in a part of the molecule separated from the rest of the molecule containing the chromophore groups by a sulphone (—$SO_2$—) bridge.

8. As new products, chromable azo dyestuffs of the triarylmethane series having the probable structure

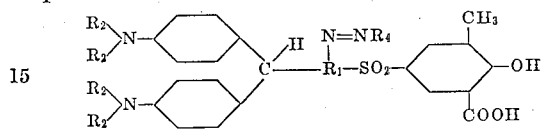

wherein $R_1$ is an aromatic residue, $R_2$ represents alkyl groups and $R_4$ is a residue from the usual azo dye second components containing hydroxy or amino groups or both, the said dyestuffs having the chelate group situated in a part of the molecule separated from the rest of the molecule containing the chromophore groups by a sulphone (—$SO_2$—) bridge.

9. As new products, chromable azo dyestuffs of the triarylmethane series having the probable formula

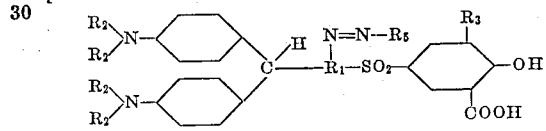

Wherein $R_1$ represents an aromatic residue, $R_2$ represents alkyl groups, $R_3$ is a substituent group and $R_5$ represents an aryl residue from an azo dye second component, the said dyestuffs having the chelate group situated in a part of the molecule separated from the rest of the molecule containing the chromophore groups by a sulphone (—$SO_2$—) bridge.

10. As new products, chromable azo dyestuffs of the triarylmethane series having the probable structure

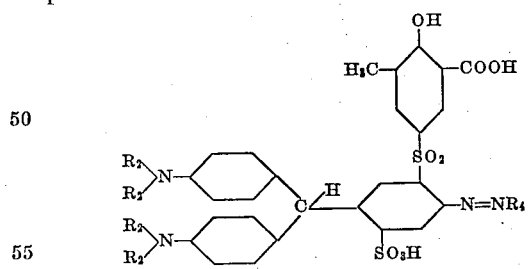

wherein $R_2$ represents alkyl groups and $R_4$ is the residue from the usual azo dye second component, containing hydroxy or amino groups or both, the said dyestuffs having the chelate group situated in a part of the molecule separated from the rest of the molecule containing the chromophore groups by a sulphone (—$SO_2$—) bridge.

11. As new products, chromable azo dyestuffs of the triarylmethane series having the probable structure

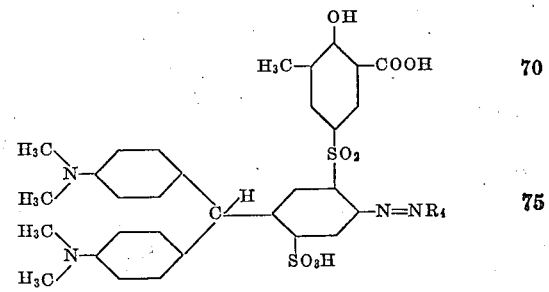

wherein $R_4$ is the residue from the usual azo dye second components, containing hydroxy or amino groups, or both, the said dyestuffs having the chelate group situated in a part of the molecule separated from the rest of the molecule containing the chromophore groups by a sulphone (—$SO_2$—) bridge.

12. As a new product, the chromable azo dyestuff of the triarylmethane series having the probable structure

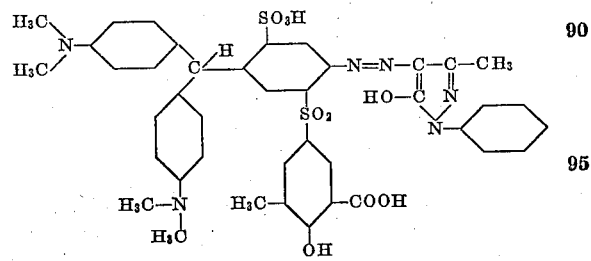

the said dyestuff being a dark colored powder and giving on wool from an acid bath yellow shades passing on after-chroming to bright yellowish green.

K. H. SAUNDERS.